United States Patent

[11] 3,588,388

| [72] | Inventor | Richard A. Harris<br>Greensboro, N.C. |
|---|---|---|
| [21] | Appl. No. | 864,439 |
| [22] | Filed | Oct. 7, 1969 |
| [45] | Patented | June 28, 1971 |
| [73] | Assignee | Western Electric Company, Incorporated<br>New York, N.Y. |

[54] OPPOSED PULLEY ARRANGEMENT FOR ELIMINATING THE TENSION OF AN ELECTRICAL CABLE CONNECTED TO A MOVABLE TABLE
2 Claims, 2 Drawing Figs.

[52] U.S. Cl. .................................................. 191/12R,
242/155R, 108/87
[51] Int. Cl. ....................................................... H02g 11/00
[50] Field of Search .......................................... 191/12 (R),
12 (C), 12.2; 248/332; 254/188, 189, 191; 308/18;
74/230.01, 230.05, 230.3; 114/213, 215; 108/87,
120, 137, 138, 143; 242/155; 339/9; 174/69; 33/1
(M), 23 (C)

[56] References Cited
UNITED STATES PATENTS

| 213,629 | 3/1879 | Cottingham | 114/213 |
|---|---|---|---|
| 1,080,043 | 12/1913 | Bradner | 108/87 |
| 2,395,485 | 2/1946 | Jones | 191/12 |

Primary Examiner—Arthur L. La Point
Assistant Examiner—I. Kenneth Silverman
Attorneys—W. M. Kain, R. P. Miller and W. L. Williamson ABSTRACT: A plurality of cables and/or air hoses are connected to a movable table by an opposed pulley arrangement to prevent the cables from applying tension to the table. A pair of cables extend in opposite directions from the table over first pulleys mounted on a frame and over second pulleys mounted on a block slidably mounted on the frame. The two cables produce opposite and equal tension on the movable table. The slidable block moves opposite and one-half the distance of the table.

PATENTED JUN28 1971　　　　　　　　　3,588,388

INVENTOR
R. A. HARRIS
By D. W. Marks
ATTORNEY

OPPOSED PULLEY ARRANGEMENT FOR ELIMINATING THE TENSION OF AN ELECTRICAL CABLE CONNECTED TO A MOVABLE TABLE

BACKGROUND OF THE INVENTION

1. Field of the Invention

Movable or indexable tables are utilized in a variety of manufacturing machines for supporting tools and other facilities. In many of these machines it is necessary to connect one or more electrical cables or air hoses to the tool or facility mounted on the table. Some arrangement must be provided for connecting such cables or air hoses to the facilities to allow for movement of the table.

2. Description of the Prior Art

In the prior art, cables are generally provided with helical spring devices in order to take up the slack in the cable as the table is indexed from point to point. The helical spring devices apply a tension to the table which can produce error in the indexing of the table.

SUMMARY OF THE INVENTION

An object of the invention is an arrangement for connecting electrical cables, and the like, to a movable table such that the cable does not apply a tension to the table.

With this and other objects in view, an apparatus embodying the principles of the invention incorporates an opposed pulley arrangement for connecting various cables, and the like, to the table. In particular, cables extend in opposite directions from the table passing over stationary pulleys and pulleys mounted on a slidable block to a fixed point on the frame.

DETAILED DESCRIPTION

Figure 1:
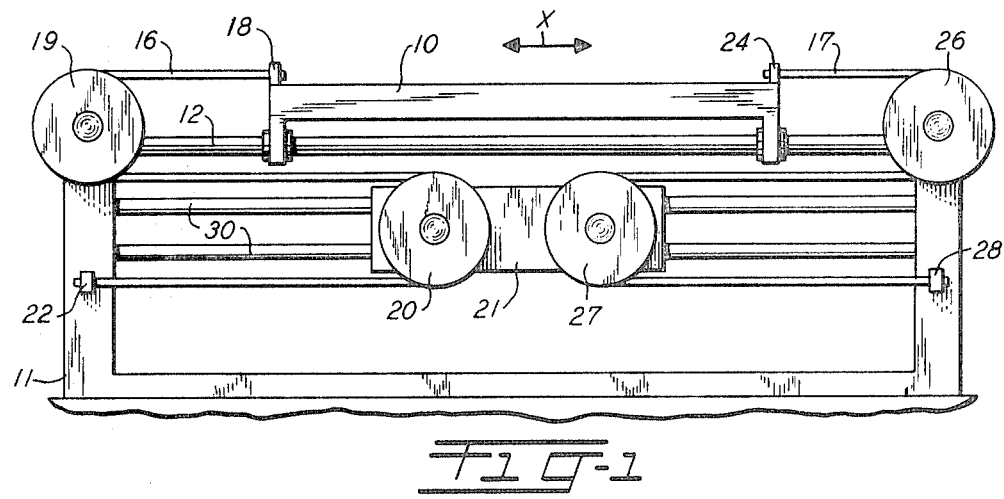
FIG. 1 shows a pulley arrangement for connecting cables to a table movable along a single axis X.

Referring to FIG. 1, there is shown a table 10 slidably supported on bars 12 of a frame 11 for movement along an axis X. Conventional indexing mechanism (not shown) may be provided for moving the table. A plurality of cables, air hoses, etc., 16 and 17 connected to the table 10, supply electrical signals or air to tools or facilities (not shown) mounted on the table 10.

The cable 16 extends from a clamp 18 on the table along the X axis over a pulley 19 mounted on the frame 11 and a pulley 20 mounted on a slidable block 21 to a clamp 22 on the frame 11. The cable 17 extends in an opposite direction from a clamp 24 on the table 10 over a pulley 26 on the frame 11 and over a pulley 27 on the slidable block 21 to a clamp 28 on the frame 11. The slidable block 21 is slidably mounted along the X axis on a pair of bars 30 mounted on the frame 11. The pulleys 19, 20, 26 and 27 and the bars 30 are positioned such that the cables 16 and 17 are parallel to the movement of the table except where engaged by a pulley.

The cables 16 and 17 can each be a plurality of cables and/or hoses. The pulleys 19, 20, 26 and 27 could then have a plurality of grooves therein for seating each of the cables.

Equal and opposite tension is applied to the table 10 by the opposing cables 16 and 17. When the table 10 is indexed in one direction along the X axis, the slidable block 21 moves in the opposite direction along the X axis by one-half the length of movement of the table 10. The tension applied to the table 10 by the cables 16 and 17 is equal and opposite producing zero resultant tension. Only a negligible amount of tension is produced by friction and bending resistance during movement of the table 10.

Figure 2:
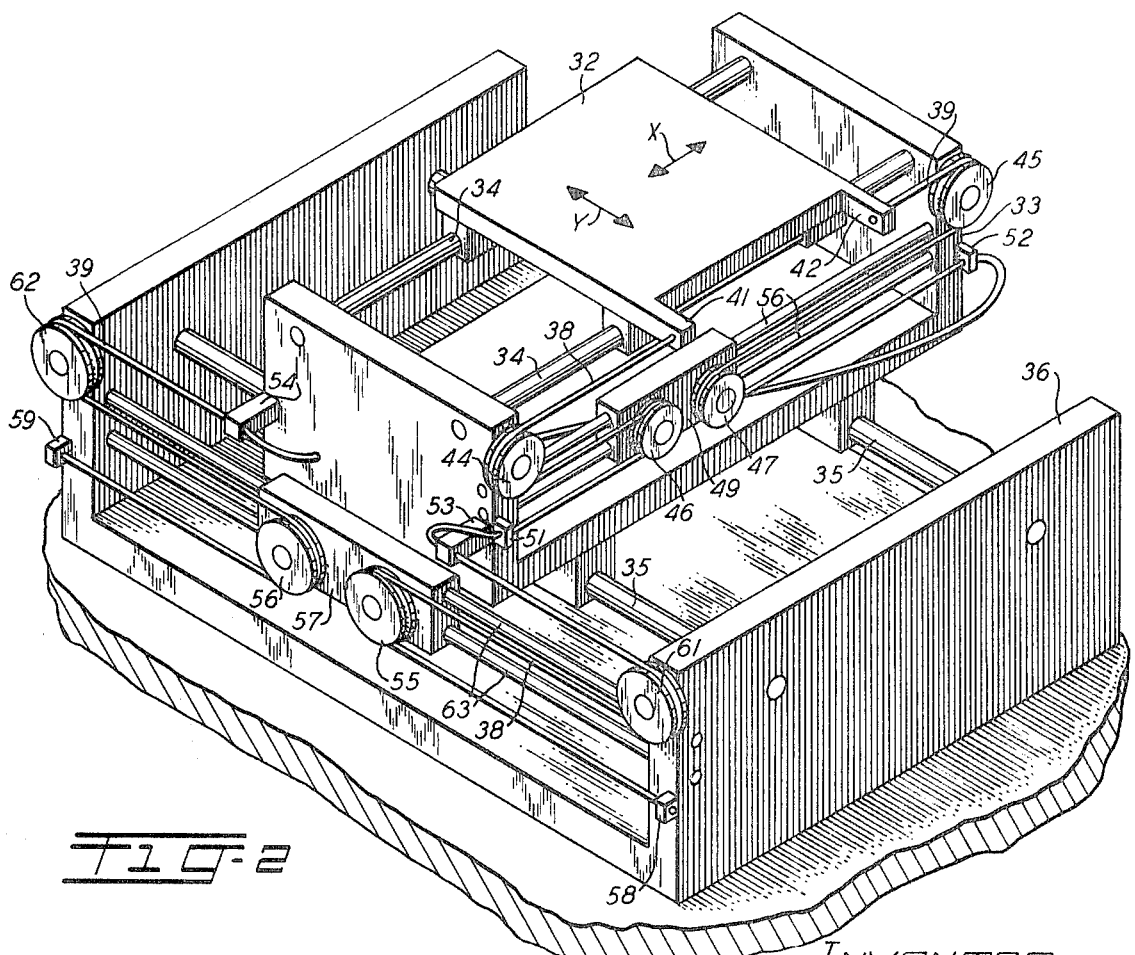
FIG. 2 shows an arrangement for connecting cables to a table movable along two axes X and Y.

Referring to FIG. 2, there is shown a table 32 indexable in both X and Y directions. The table 32 is slidably mounted on bars 34 of a frame 33 for movement along the X axis. The frame 33 is slidably mounted on bars 35 of a support 36 for movement along the Y axis. Suitable mechanisms (not shown) may be provided for indexing the table along the X and Y axes.

Cables 38 and 39 extend in opposite directions from clamps 41 and 42 on the table 32 over pulleys 44 and 45 mounted on the frame 33 and over pulleys 46 and 47 mounted on a slidable block 49 to clamps 51 and 52 on the frame 33. The block 49 is slidably mounted on bars 50 of the frame 33 for movement along the X axis. The cables 38 and 39 then extend from clamps 53 and 54 on the frame 33 over pulleys 61 and 62 mounted on the support 36 and over pulleys 55 and 56 mounted on slidable block 57 to clamps 58 and 59 on the support 36. The block 57 is slidably mounted on bars 63 of the support 36 for movement along the Y axis.

Movement of the table 32 in the X direction produces opposite movement of the block 49 equal to one-half the distance of movement of the table 32. Similarly, movement of the table 32 and frame 33 in the Y direction produces opposite movement of the block 57 equal to one-half the distance of movement of the table 32 and frame 33. The resultant tension on the table in the X and Y directions due to the cables 38 and 39 is zero.

The cable supporting arrangement in FIG. 2, may be utilized to connect to a unit movable in X, Y and Z by adding the described opposed arrangement to a unit mounted on the table 32 for movement along the Z axis.

The above-described embodiments are only illustrative of the principles of the invention and many embodiments may be devised without departing from the scope and spirit of the invention.

I claim:

1. An arrangement for providing tension free connection of first and second cablelike members to a table slidably mounted on a frame comprising:
   first and second cablelike members secured to the table;
   first and second pulleys mounted on the frame with the first and second cablelike members extending over said pulleys in opposite directions from the table securing means and parallel to a direction of movement of the table;
   a block slidably mounted on the frame moving parallel to the direction of movement of the table;
   means for securing the first and second cablelike members to the frame; and
   third and fourth pulleys mounted on the slidable block with the first and second cablelike members extending from the first and second pulleys over the third and fourth pulleys and running parallel to the direction of movement of the table to the frame securing means.

2. An opposed pulley arrangement for providing tension free connection of first and second cablelike members to a table slidably mounted on a frame for movement along a first axis wherein the frame and table are slidably mounted on a support for movement along a second axis, comprising:
   first and second cablelike members secured to the table;
   first and second pulleys mounted on the frame with the first and second cablelike members extending over said pulleys in opposite directions from the table securing means, and parallel to the first axis;
   a first block slidably mounted on the frame moving parallel to the first axis;
   means for securing the first and second cablelike members to the frame;
   third and fourth pulleys mounted on the first block with the first and second cablelike members extending from the first and second pulleys over the third and fourth pulleys and running parallel to the first axis to the frame securing means;
   fifth and sixth pulleys mounted on the support with the first and second cablelike members extending over the fifth and sixth pulleys in opposite directions from the frame securing means, and parallel to the second axis;
   a second block slidably mounted on the support moving parallel to the second axis;

means for securing the first and second cablelike members to the support; and seventh and eighth pulleys mounted on the second block with the first and second cablelike members extending from the fifth and sixth pulleys over the seventh and eight pulleys and running parallel to the second axis to the support securing means.